March 26, 1963 W. BOCK ETAL 3,082,463
SECURING DEVICE FOR WINDSHIELD WIPER BLADES
Filed Aug. 19, 1958 3 Sheets-Sheet 1

INVENTORS
WILLY BOCK
HANS PROHASKA
BY Dicke and Craig
ATTORNEYS

March 26, 1963 W. BOCK ETAL 3,082,463
SECURING DEVICE FOR WINDSHIELD WIPER BLADES
Filed Aug. 19, 1958 3 Sheets-Sheet 2

INVENTORS
WILLY BOCK
HANS PROHASKA
BY Dicke and Craig
ATTORNEYS

March 26, 1963  W. BOCK ETAL  3,082,463
SECURING DEVICE FOR WINDSHIELD WIPER BLADES
Filed Aug. 19, 1958  3 Sheets-Sheet 3

INVENTORS
WILLY BOCK
HANS PROHASKA
BY Dicke and Craig
ATTORNEYS

United States Patent Office 3,082,463
Patented Mar. 26, 1963

3,082,463
SECURING DEVICE FOR WINDSHIELD
WIPER BLADES
Willy Bock and Hans Prohaska, both of Bietigheim,
Wurttemberg, Germany, assignors to SWF-Spezial-
fabrik für Autozubehör Gustav Rau G.m.b.H., Wurt-
temberg, Germany
Filed Aug. 19, 1958, Ser. No. 756,026
Claims priority, application Germany Aug. 23, 1957
9 Claims. (Cl. 15—250.32)

The present invention relates to improvements in windshield wipers for motor vehicles, and more particularly to novel means which permit a windshield wiper blade to be securely connected to or removed from a wiper arm without the aid of any tools.

In earlier windshield wiper mechanisms, the wiper blade and the wiper arm, which is driven in an oscillatory movement by a windshield wiper motor, were usually secured to each other by means which could not be released except by special tools. Nowadays, however, the wiper blades and wiper arms are preferably provided with connecting means which may be operated without the aid of any tools to secure the blades and arms to each other or to remove the blades from the wiper arms. Aside from numerous known metallic connecting devices of this type, there has also been a prior proposal of a blade holder which consisted of a molded element of rubber or a resilient plastic which was secured to the wiper blade by being encased within a metallic housing on the back of the blade. Such metallic housing was provided with suitable apertures into which the wiper arm was to be inserted which was then resiliently clamped by the rubber insert.

It is an object of the present invention to provide a wiper blade holding and connecting device which consists entirely of a resilient material, and preferably of a synthetic plastic and which affords considerable advantages over all releasable wiper-blade connecting means which have been previously proposed. These advantages consist primarily in a more simple and inexpensive manner of construction of the new blade holding and connecting device, and, because of the omission of any metallic parts, in the prevention of any corrosion of the device.

Another object of the present invention consists in providing a wiper-blade holder of the above-mentioned kind which consists of a single piece of resilient material which may be molded in a single operation, and which may be very easily connected to the wiper blade so as to be pivotable thereon, and which may be very easily and securely connected to the wiper arm and just as easily removed from such arm without the aid of any tools.

The wiper blade holder according to the present invention includes certain resilient parts of a suitable shape which may be connected to the free end portion of a wiper arm of a corresponding shape by being elastically deformed while the blade holder is being fitted over the wiper arm, and by then automatically engaging with the latter in a locking position.

According to a preferred embodiment of the invention, these locking parts of the wiper blade holder are provided on a resilient extension thereof which is designed so that, when the end portion of the wiper arm is inserted into the blade holder, the locking action will occur automatically, while for unlocking and withdrawing the holder from the wiper arm, it will be necessary to bend the resilient extension away from the end portion of the wiper arm.

For pivotably connecting the blade holder to the wiper blade or, more properly speaking, to the metallic or plastic backing of the actual blade of rubber or other resilient material, the blade holder according to the invention is preferably provided with a substantially U-shaped extension forming a pair of lateral walls between which the wiper blade may be inserted. At a substantially central point of these lateral walls, a pivoting pin, for example, a hollow rivet, may then be inserted on which the wiper blade may easily pivot in the longitudinal direction thereof. At the bottom of the U-shaped portion of the blade holder, the same is preferably provided with a semi-circular web which extends transversely to the direction of the wiper blade, and the peripheral surface of which is adapted to engage with the back of the wiper blade. When the wiper blade pivots in one or the other direction relative to the blade holder, it also rolls along this semicircular periphery of the weblike projection and thus always remains in a positive engagement therewith. In order to mount the blade holder relatively firmly on the wiper blade and to prevent at the same time any excessive friction between the inner surfaces of the U-shaped portion and the sides of the wiper blade, these inner surfaces may on the whole be spaced from each other at a distance slightly greater than the thickness of the blade, and small riblike projections may be provided on these inner wall surfaces which engage with the sides of the blade and thus guide the blade so that the latter will always pivot within the plane of the wiper arm.

Further objects, features, and advantages of the present invention will become apparent from the following detailed description thereof, particularly when read with reference to the accompanying drawings, in which—

FIGURE 10 shows a horizontal section taken directly above the upper surface of the wiper arm of FIGURE 9; while

Figure 1:
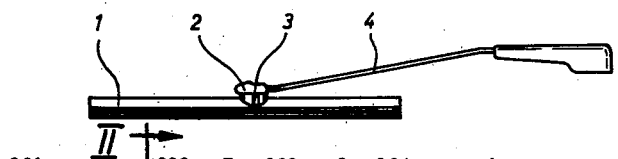
FIGURE 1 shows on a reduced scale a view of the assembly of a wiper blade and a wiper arm by means of the blade holder according to the invention.

Referring to the drawings, FIGURE 1 illustrates the entire wiper blade assembly including a wiper blade 1, a blade holder 2 entirely of resilient material, a pivot pin 3 for pivotably connecting the wiper blade 1 to blade holder 2, and a wiper arm 4 which is inserted into blade holder 2 until it is locked therein in a fixed position.

Figure 2:
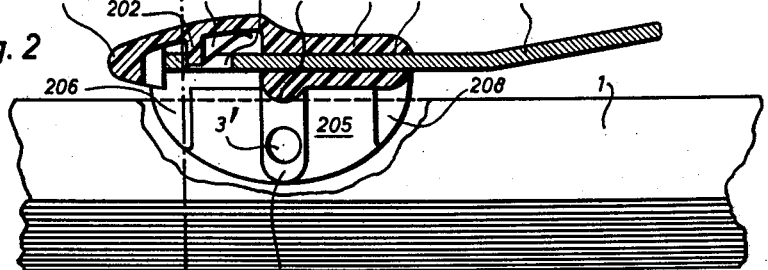
FIGURE 2 shows a longitudinal section of a blade holder according to one embodiment of the invention with a locking extension thereon which has to be lifted to permit the blade holder to be unlocked and withdrawn from the wiper arm.
Figure 3:
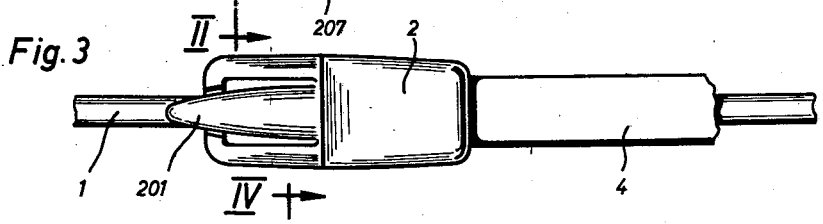
FIGURE 3 shows a top view of FIGURE 2.
Figure 2A:
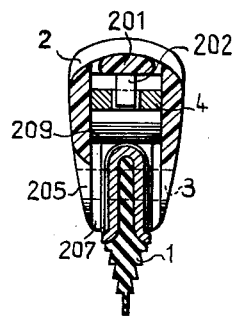
FIGURE 2a shows a cross-sectional view of the embodiment of the invention illustrated in FIGURE 2 taken along section line II—II.

As illustrated in FIGURES 2, 2a and 3, the blade holder 2 which is made of a single piece of resilient material, preferably of a resilient synthetic plastic, has an extension 201 of a highly resilient construction. Approximately at the center of this extension 201, the same is provided with a projection 202 which is adapted to engage into an aperture 5 in the end portion of the wiper arm 4. In order to insure an automatic engagement of projection 202 in aperture 5, the projection is provided with an inclined web 203. Thus, when wiper arm 4 is being inserted into blade holder 2, the free end of the arm will engage with the inclined surface of web 203 and thereby bend the resilient extension 201 upwardly until arm 4 has been inserted to such an extent that projection 202 can snap through its own resiliency into aperture 5. For securing blade holder 2 as securely as possible to wiper arm 4, the holder is provided with a bore 204 of a length corresponding to approximately one-half of the length of the entire holder and of a cross-sectional size and shape corresponding to that of wiper arm 4 or even of a slightly smaller size so that the enclosed portion of the wiper arm will be firmly gripped by the wall of bore 204.

For securing the blade holder 2 to blade 1, a pair of lateral wall portions 205, one of which is shown in FIGURE 2, extend downwardly from the body of the blade holder, between which the blade is then inserted and pivotably secured by pivot pin 3 in bore 3'. The inner surfaces of wall portions 205 facing toward the blade are provided with three ribs 206, 207, and 208 which, when blade holder 2 is secured to blade 1 engage with the blade to guide the latter so as to pivot only within the plane of wiper arm 4 and to prevent too great a friction of walls 205 with blade 1. For attaining a positive connection between blade holder 2 and blade 1 at all times, the bottom of the U-shaped portion formed by the two wall portions 205 is further provided with a central semicircular web 209 which engages with the back of wiper blade 1 regardless of the angle at which the blade might be pivoted relative to the blade holder.

Figure 4:
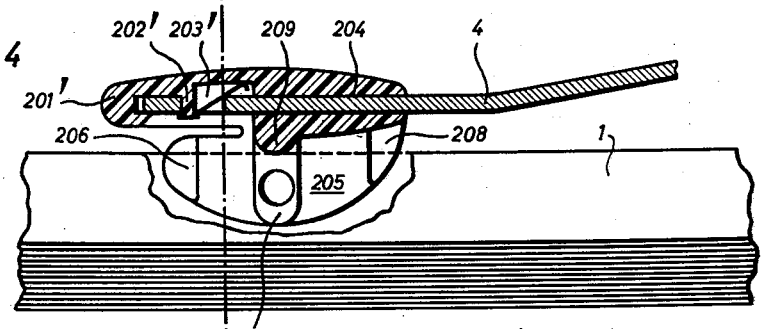
FIGURE 4 shows a longitudinal section of a modification of the blade holder according to the invention with a slightly different locking extension.
Figure 5:
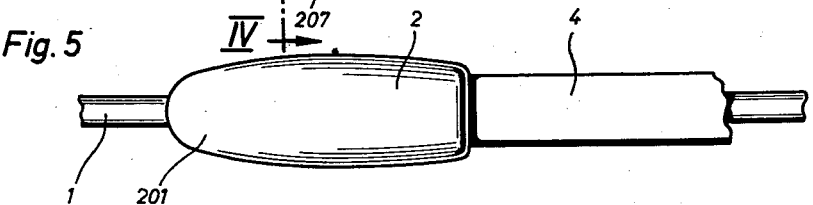
FIGURE 5 shows a top view of FIGURE 4.
Figure 4A:
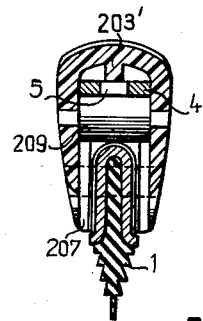
FIGURE 4a shows a cross-sectional view of the embodiment of the invention illustrated in FIGURE 4 taken along section line IV—IV.
Figure 9A:
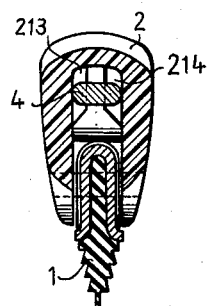
FIGURE 9a shows a cross-sectional view of the embodiment of the invention illustrated in FIGURE 9 taken along section line IX—IX.

The embodiment of the invention according to the modification as illustrated in FIGURES 4, 4a and 5 differs from the embodiment shown in FIGURES 2, 2a and 3 merely by the fact that the resilient extension 201' of blade holder 2 carrying the locking projection 202', 203' is made of a greater width and thus forms an unbroken surface with the remainder of the blade holder, as shown particularly in FIGURE 5. In both embodiments according to FIGURES 1 to 5 it is necessary to bend the extension 201' upwardly away from blade 1 to disengage the locking projection 202', 203' from aperture 5 in arm 4 to permit blade holder 2 to be withdrawn from arm 4.

In the further embodiment of the invention according to FIGURES 6, 6a, 7, and 8, in which the wiper blade has been omitted for the sake of clarity of the illustration, the position of the locking extension 210 on blade holder 2 has been reversed relative to its position in the embodiments according to FIGURES 2 to 5. This extension 210 has a pair of opposite toothlike projections 211 which, when the end portion of wiper arm 4 is fully inserted into bore 204 engage into the opposite recesses 212 of a corresponding shape in wiper arm 4. During the insertion of wiper arm 4 into bore 204, the resilient projections 211 will be bent away until their position coincides with that of recesses 212 when they will snap resiliently into these recesses and thus lock the blade holder 2 to the wiper arm 4. The same procedure occurs when the blade holder 2 is being withdrawn from the wiper arm. It then requires a force sufficient to bend the tooth-like projections 211 out of recesses 212 to disengage them from each other before blade holder 2 can be pulled from wiper arm 4.

Figure 6A:
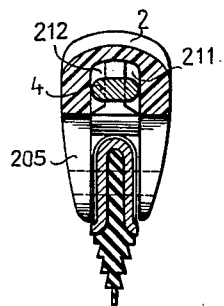
FIGURE 6a shows a cross-sectional view of the embodiment of the invention illustrated in FIGURE 6 taken along section line VI—VI.
Figure 6:
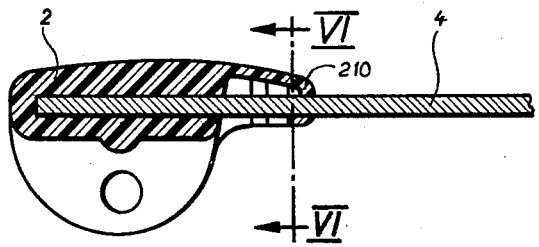
FIGURE 6 shows a longitudinal section of a blade holder according to another modification of the invention in which the locking projections have to be elastically deformed for mounting the blade holder on the wiper arm or for removing it therefrom.
Figure 7:
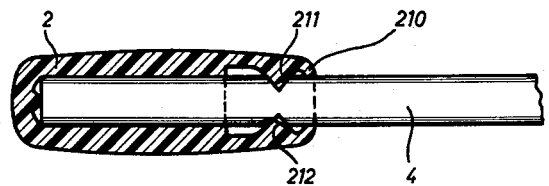
FIGURE 7 shows a horizontal section taken directly above the upper surface of the wiper arm of FIGURE 6.
Figure 8:
FIGURE 8 shows a top view of FIGURE 6.
Figure 9:
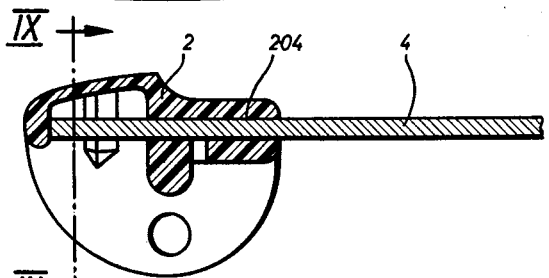
FIGURE 9 shows a longitudinal section of still another modification of the blade holder according to the invention.
Figure 10:
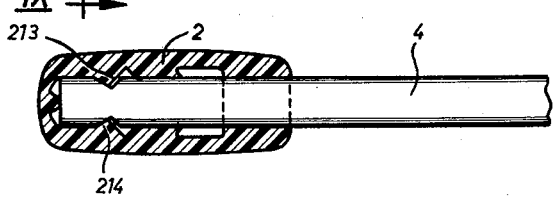
Figure 11:
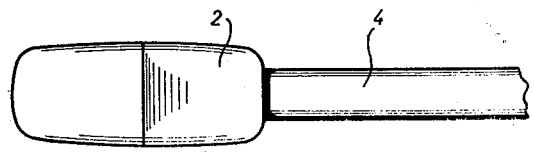
FIGURE 11 shows a top view of FIGURE 9.

The fourth embodiment of the invention, as illustrated in FIGURES 9, 9a, 10, and 11 is very similar to the embodiment shown in FIGURES 6 to 8, except for the fact that the locking extension of the blade holder is located at the other end thereof and the resilient toothlike projections 213 engage with corresponding recesses 214 in the end portion of wiper arm 4. When blade holder 2 is fitted over wiper arm 4 or withdrawn therefrom, this has to be done with sufficient force to bend or compress the resilient projections 213 away from the wiper arm until they can either snap into or slide out of recesses 214 in wiper arm 4.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. In a windshield wiper arrangement including a wiper blade and a wiper arm having a free end portion, a device for securing said wiper blade to said wiper arm without the aid of tools, comprising a holder member adapted to have said wiper arm inserted thereinto consisting exclusively of resilient plastic material and including at least one locking portion and an abutment means, means for securing said wiper blade to said holder member, said wiper arm being provided with complementary means for interengagement with said locking portion, said abutment means, said locking portion and said complementary means together forming a means for removably securing said holder member to said wiper arm, said wiper arm being supported at a plurality of points within said holder means, said locking portion being elastically deformable by the free end portion of said wiper arm when said wiper arm is inserted into said blade holder member and engaging in said complementary means provided on said wiper arm upon insertion of said holder member over the end portion of said arm to lock said wiper arm, said abutment means resiliently engaging with the free end surface of the free end portion of said wiper arm when said wiper arm is in its locked position to prevent movement of the holder member relative to said wiper arm.

2. A device as defined in claim 1, wherein said holder member is provided with an extension, said abutment means being arranged essentially at the end of said extension and said locking portion being arranged intermediate the ends of said extension and projecting therefrom, said holder member being so constructed and arranged that the holder member can be withdrawn from said wiper arm only after said extension has been bent so as to disengage said locking portion from said complementary means.

3. A device as defined in claim 1, wherein said holder member is provided with an extension, said abutment means being arranged essentially at the end of said extension and said locking portion being arranged intermediate the ends of said extension and projecting therefrom, said complementary means forming a recess in the free end portion of said wiper arm, said locking projection being so constructed and arranged as to be resiliently bent away from said free end portion of said wiper arm when said holder member is fitted over said end portion and to snap resiliently into said recess when said resilient member has been fully fitted over said end portion, said resilient holder member being constructed and arranged so as to be withdrawn from said wiper arm only after said extension has been lifted so as to withdraw said locking projection from said recess in said wiper arm.

4. A device as defined in claim 3, wherein said locking projection has a substantially flat locking surface on one side thereof and a web on the other side thereof, said web having an inclined edge surface, said inclined surface being adapted to engage with the free end of said wiper arm when said resilient holder member is being fitted over said end portion of said arm so as to thereby bend said extension upwardly and away from said end portion until said holder member has been fully fitted over said end portion and said locking projection substantially coincides with said recess in said wiper arm allowing said locking projection to snap into said recess and said extension to bend back to its normal position, said flat locking surface securely retaining said wiper arm when said extension is in its normal position.

5. A device as defined in claim 1, wherein said locking portion includes a pair of oppositely disposed tooth-like projections arranged within said holder member, said projections being so constructed and arranged as to be disengaged from the free end of said wiper arm when said holder member is pushed over said free end and when it is withdrawn therefrom, said free end of said wiper arm having a pair of oppositely disposed recesses constituting said complementary means, said projections engaging into said recesses in a tong-like manner when said holder member is fully pushed over said free end into abutment with said abutment means.

6. A device as defined in claim 1, wherein said means for securing said resilient holder member to said wiper blade includes a substantially U-shaped extension on said member adapted to receive said wiper blade, said wiper blade and said U-shaped extension being provided with aperture means, and a pin passing through said aperture means in said U-shaped extension and said wiper blade for connecting said blade to said holder member for pivotal movement of said blade about said pin.

7. A device as defined in claim 6, wherein the bottom of said U-shaped extension has a substantially semi-circular projection extending in a direction transverse to the longitudinal direction of the wiper blade, the back of said wiper blade being adapted to operatively abut against the peripheral surface of said semi-circular projection at all pivoting angles of said blade relative to said holder member.

8. A device as defined in claim 6, wherein the inner surfaces of said U-shaped extension are spaced from each other at a distance greater than the thickness of said wiper blade, said inner surfaces having projections thereon spaced from each other at a distance substantially equal to the thickness of said wiper blade for guiding said blade so as to allow said blade to pivot only within a plane extending longitudinally through said wiper arm.

9. In a windshield wiper arrangement including a wiper blade and a wiper arm having a free end portion, a device for securing said wiper blade to said wiper arm without the aid of tools, comprising a holder member adapted to have said wiper arm inserted thereinto consisting exclusively of resilient plastic material and including as integral parts thereof at least one locking portion, an abutment means, and a bore having essentially the same size as the wiper arm extending partially therethrough and adapted to receive therein said wiper arm, said wiper arm being provided with complementary means for interengagement with said locking portion, and means including said abutment means, said locking portion and said complementary means for removably securing said holder member to said wiper arm, said wiper arm being supported at a plurality of points within said holder means, said locking portion being elastically deformable by the free end portion of said wiper arm when said wiper arm is inserted into said bore and engaging in said complementary means provided on said wiper arm to lock said wiper arm to said holder member when said wiper arm abuts against said abutment means, said abutment means resiliently engaging with the end surface of said wiper arm when said wiper arm is in its locked position to prevent movement of the holder member relative to said wiper arm.

References Cited in the file of this patent
UNITED STATES PATENTS

| 1,994,738 | Ritz-Woller | Mar. 19, 1935 |
| 2,122,802 | Rappl | July 5, 1938 |
| 2,172,928 | Anderson | Sept. 12, 1939 |
| 2,751,620 | Ehrlich | June 26, 1956 |
| 2,861,290 | Hoyler | Nov. 25, 1958 |

FOREIGN PATENTS

| 1,023,025 | France | Dec. 24, 1952 |

OTHER REFERENCES

German application No. A21858II/63C, Oct. 25, 1956.
German (printed application) 1,022,922, Jan. 16, 1958.